(12) United States Patent
Madzgalla (10) Patent No.: US 12,196,280 B2
(45) Date of Patent: Jan. 14, 2025

(54) ACTUATION DEVICE FOR AN ELECTROMECHANICALLY ACTUATABLE MOTOR VEHICLE BRAKE

(71) Applicant: ZF Active Safety GmbH, Koblenz (DE)

(72) Inventor: Lukas Madzgalla, Lahnstein (DE)

(73) Assignee: ZF Active Safety GmbH, Koblenz (DE)

(\*) Notice: Subject to any disclaimer, the term of this patent is extended or adjusted under 35 U.S.C. 154(b) by 341 days.

(21) Appl. No.: 17/705,511

(22) Filed: Mar. 28, 2022

(65) Prior Publication Data

US 2022/0307563 A1 Sep. 29, 2022

(30) Foreign Application Priority Data

Mar. 26, 2021 (DE) .......................... 102021203008.4

(51) Int. Cl.
| | | |
|---|---|---|
| *F16D 65/18* | (2006.01) | |
| *F16D 65/22* | (2006.01) | |
| *F16D 121/24* | (2012.01) | |
| *F16D 125/40* | (2012.01) | |
| *F16D 127/00* | (2012.01) | |

(52) U.S. Cl.
CPC .............. *F16D 65/18* (2013.01); *F16D 65/22* (2013.01); *F16D 2121/24* (2013.01); *F16D 2125/40* (2013.01); *F16D 2127/005* (2013.01)

(58) Field of Classification Search
CPC ...... F16D 65/18; F16D 65/22; F16D 2124/24; F16D 65/0971; F16D 65/567; F16D 2125/40; F16D 2127/005; B60T 13/741
See application file for complete search history.

(56) References Cited

U.S. PATENT DOCUMENTS

| 6,431,330 B1 * | 8/2002 | Poertzgen | .............. B60T 13/741 |
|---|---|---|---|
| | | | 188/162 |
| 10,800,391 B2 * | 10/2020 | Poertzgen | ............... F16D 65/18 |

FOREIGN PATENT DOCUMENTS

| DE | 4312524 A1 | 10/1994 |
|---|---|---|
| DE | 19621533 A1 | 12/1997 |
| DE | 102006022388 A1 | 11/2007 |
| DE | 102011080714 A1 | 12/2012 |

(Continued)

OTHER PUBLICATIONS

WO document No. WO 00/61962 to Weiler published on Oct. 19, 2000.*

(Continued)

*Primary Examiner* — Pamela Rodriguez
(74) *Attorney, Agent, or Firm* — Kristin L. Murphy (57) ABSTRACT

The disclosure relates to an actuation device for an electromechanically actuatable motor vehicle brake, for actuating at least one brake lining of the motor vehicle brake. The actuation device comprises at least one drive element, a first power transmission train, a second power transmission train and at least one actuation element. The actuation element is designed to actuate the at least one brake lining. The at least one drive element can optionally transmit drive power to the first power transmission train or to the first and the second power transmission train. The two power transmission trains are operatively connected to the at least one actuation element or can be brought into operative connection therewith.

15 Claims, 7 Drawing Sheets

(56) References Cited

FOREIGN PATENT DOCUMENTS

| | | |
|---|---|---|
| DE | 102011086152 A1 | 2/2013 |
| DE | 102017123266 A1 | 4/2019 |
| EP | 2715181 B1 | 8/2016 |

OTHER PUBLICATIONS

German Patent No. DE 102006033333 to Knop published on Aug. 16, 2007.*
WO document No. WO 94/24453 to Keller et al.published on Oct. 27, 1994.*

* cited by examiner

ACTUATION DEVICE FOR AN ELECTROMECHANICALLY ACTUATABLE MOTOR VEHICLE BRAKE

CROSS-REFERENCE TO RELATED APPLICATION

This application claims priority to German Priority Application No. 102021203008.4, filed Mar. 26, 2021, the disclosure of which is incorporated herein by reference in its entirety.

TECHNICAL FIELD

The present disclosure relates to an actuation device for an electromechanically actuatable motor vehicle brake, and an electromechanically actuatable motor vehicle brake comprising Such an actuation device.

BACKGROUND

Electromechanically actuated brakes are known per se from the prior art:

For example, EP 2 715 181 BI discloses an electromechanically actuatable motor vehicle brake which, using a wrap spring clutch, functions as a service brake and as a parking brake.

DE 196 21 533 A1 discloses a braking device for a vehicle, comprising an actuation device which has an electric operating motor for driving the actuation device, an electric readjusting motor for setting a clearance, and a parking brake device.

DE 10 2017 123 266 A1 discloses a mechanical braking apparatus which comprises two servo drives connected in series for providing a service brake function and wear adjustment.

SUMMARY

In accordance with one aspect of the present disclosure an actuation device for an electromechanically actuatable motor vehicle brake is disclosed, which actuation device, in a compact design, operates to ensure a safe service brake function and a safe parking brake function.

In accordance with another aspect of the disclosure, an electromechanically actuatable motor vehicle brake is disclosed that comprises an actuation unit of this kind.

In accordance with one aspect of the disclosure, an actuation device according to the disclosure is used in an electromechanically actuatable motor vehicle brake to actuate a brake lining and comprises at least one drive element, a first power transmission train, a second power transmission train and at least one actuation element. The actuation element is designed to actuate a brake lining. The actuation device is constructed in such a way that the at least one drive element can optionally transmit drive power to the first or to the first and second power transmission train. The two power transmission trains are operatively connected to the at least one actuation element or can be brought into operative connection therewith.

The drive element can comprise an input shaft, an input flange or a similar element. It is designed in such a way that it can transmit a rotational movement and/or a torque.

The power transmission trains comprise various machine elements and are suitable for transmitting drive power, i.e. forces, torques and movements in the form of rotation and/or translation. Drive power is also understood to mean the transmission of forces, torques and movements that result in a static state within the power transmission trains.

The actuation element can be designed as a piston, for example as a brake piston. In any case, it is suitable for transmitting a thrust force to a brake lining.

An operative connection is understood to mean a connection by which forces and/or torques and/or movements can be transmitted.

An exemplary advantage of optionally activating the power transmission trains is that, using the same drive element, both brake actuation (service brake function), which takes place via the first power transmission train, and wear adjustment, which takes place via the second power transmission train, are possible.

In one exemplary arrangement, the first power transmission train comprises a rotation-translation gear mechanism by which a rotational movement of the at least one drive element can be converted into a translational movement. The second power transmission train also may comprise a rotation-translation gear mechanism by which a rotational movement of the at least one drive element can be converted into a translational movement.

In one exemplary arrangement, the rotation-translation gear mechanisms can be designed as a lead screw arrangement (spindle-nut arrangement), rolling body ramp gears or in an alternative manner.

The rotation-translation gear mechanisms of the first and the second power transmission train are each designed as a lead screw arrangement.

In one exemplary arrangement, the rotation-translation gear mechanism of the first power transmission train is not self-locking and the rotation-translation gear mechanism of the second power transmission train is self-locking.

In order to actuate the brakes in the service brake function, the rotational movement is converted into a translational movement, by which the actuation element is moved in a translational manner. When the brake actuation is withdrawn, it is necessary that the actuation element can be easily be moved back partially or completely into the starting position. The non-self-locking rotation-translation gear mechanism of the first power transmission train becomes important for this purpose. For the adjustment function, the rotational movement is also converted into a translational movement by which the actuation element is moved in a translational manner. In this case, an adjustment takes place simultaneously via the non-self-locking rotation-translation gear mechanism and via the self-locking rotation-translation gear mechanism of the second power transmission train. If an adjustment has taken place in which the self-locking rotation-translation gear mechanism has also generated a translational movement, the adjustment path that is correspondingly covered is retained on account of the self-locking, even when the brake is released. As the wear of an associated brake lining increases, the starting position of the brake lining moves towards a brake body in accordance with the wear.

The two rotation-translation gear mechanisms can be arranged in such a way that, on the inside, the rotation-translation gear mechanism of the first power transmission train is not a self-locking lead screw arrangement and, on the outside, the rotation-translation gear mechanism of the second power transmission train is a self-locking lead screw arrangement. The outer rotation-translation gear mechanism is designed in such a way that it has a cavity in which the rotation-translation gear mechanism of the first power transmission train is installed. This results in a particularly compact structure.

In one exemplary arrangement, the at least one drive element is operatively connected to the at least two power transmission trains such that, when the at least one drive element rotates in a first rotational angle range, drive power is transmitted to the at least one actuation element via the first power transmission train and that, when the at least one drive element rotates in a second rotational angle range, drive power is transmitted to the at least one actuation element via the first and the second power transmission train. The rotational angle ranges are arranged in such a way that the second rotational angle range adjoins the first rotational angle range. This means that the rotational angle ranges are arranged one after the other.

This can be achieved using a free-play coupling which comprises a drive coupling part and an output coupling part. The drive coupling part can be rotated in the first rotational angle range without the output coupling part being entrained in rotation (play). In the first rotational angle range, the drive coupling part only transmits drive power via the first power transmission train. If the rotation of the drive coupling part exceeds the first rotational angle range, the output coupling part is entrained in rotation and drive power is thus transmitted via the second power transmission train and in parallel via the first power transmission train. The play and the rotational entrainment can be designed in such a way that one of the two coupling parts has a recess and the other coupling part has a projection which can move within the recess. This movement corresponds to the first rotational angle range. If the rotation of the drive coupling part exceeds the first rotational angle range, the projection comes into contact with a boundary of the recess, as a result of which the output coupling part is entrained in rotation while the drive coupling part continues to rotate. The recess and the projection are also designed such that they allow a translational relative movement between the drive coupling part and the output coupling part. The use of such a free-play coupling ensures a reliable change between the power transmission trains and thus also ensures reliable wear adjustment.

In a one exemplary arrangement, the drive element comprises the drive coupling part or is designed as a component.

The actuation device can be constructed in such a way that drive power is only provided via the second power transmission train if a particular reaction force that the actuation element experiences when the actuation device is actuated is not exceeded. For this purpose, a spring arrangement can be installed in the actuation device as a control mechanism, such that the spring arrangement is compressed and a tension builds up when, upon actuation of the actuation device, the actuation element experiences a reaction force which is transmitted to the spring arrangement. A spring arrangement of this kind is not susceptible to failure and contributes to the functional reliability and reliable wear readjustment.

In one exemplary arrangement, the actuation device comprises at least one clutch, wherein the clutch, in a first shift mode, allows power to be transmitted from the at least one drive element to the first and/or the second power transmission train, and wherein the clutch, in a second shift mode, allows power to be transmitted from the at least one drive element to a third power transmission train, wherein the third power transmission train is operatively connected to the at least one actuation element or can be brought into operative connection therewith.

The actuation device is actuated via the third power transmission train in order to bring a motor vehicle brake into a parking brake mode or to activate the parking brake function.

In one exemplary arrangement, the rotation-translation gear mechanism of the second power transmission train also part of the third power transmission train, wherein the at least one drive element is operatively connected to the at least three power transmission trains or can be brought into operative connection therewith such that, when the at least one drive element rotates in a third rotational angle range which adjoins the first rotational angle range, drive power is transmitted to the at least one actuation element via the third power transmission train.

Both the second rotational angle range and the third rotational angle range are arranged so as to follow the first rotational angle range. The rotational angle ranges can be the same size, but they can also be different sizes. Their size results in each case from the respective operating conditions or boundary conditions when the actuation device is used in a motor vehicle brake. By using the clutch, it is possible to assign these machine components of the actuation device to different power transmission trains. This leads to the actuation device having a compact structure.

If drive power is conducted via the third power transmission train when the actuation device is operated in a motor vehicle brake, this leads to the parking brake function being activated as a result of the rotational movement being converted into a translational movement in the self-locking rotation-translational gear mechanism of the third power transmission train. The drive power is conducted to the at least one actuation element in such a way that, by introducing the drive power to the at least one actuation element, said element experiences a reaction force which reflects back into the actuation device, causes the self-locking rotation-translation gear mechanism to self-lock and thus blocks the at least one actuation element from moving back.

The clutch preferably shifts, in a torque-dependent manner, at a threshold torque. The at least one drive element provides a torque. In the first shift mode, the torque of the at least one drive element is less than the threshold torque. In the second shift mode, the torque of the at least one drive element is greater than the threshold torque.

In order to activate the parking brake function of a motor vehicle brake, a higher braking torque and thus a higher actuation force of the actuation element is required by comparison with the service brake function. Shifting the clutch in a torque-dependent manner is therefore advantageous.

In one exemplary arrangement, the clutch is designed as a self-shifting clutch.

In one exemplary arrangement, the self-shifting clutch is designed in the manner of a safety clutch, and in one particular arrangement, in the manner of a positive safety clutch.

The electromechanically actuatable motor vehicle brake according to the disclosure comprises a brake assembly, at least one brake lining, and at least one electromechanical actuation unit which comprises an actuation device according to any of the exemplary arrangements described above and a motor drive which drives the at least one drive element of the actuation device.

In one exemplary arrangement, the motor drive comprises an electric motor and a gear mechanism.

The motor vehicle brake according to the disclosure provides a service brake function and a parking brake function. Both brake actuation and wear readjustment are provided as part of the service brake function. Wear adjustment is used to set or readjust a basic position of the brake lining relative to a brake body (brake disk or brake drum) in order to maintain a defined clearance between the brake lining and the brake body. The first power transmission train is assigned to brake actuation as part of the service brake function. The second power transmission train is responsible for the wear adjustment. Accordingly, a drive power is transmitted via the first and/or the second power transmission train to the actuation element and thus to the at least one brake lining. The actuation element is coupled to the at least one brake lining such that forces and movements are conducted from the at least one actuation element to the at least one brake lining, and such that reaction forces which the at least one brake lining experiences as a result of brake contact with the brake disk are also conducted back into the at least one actuation device.

The parking brake function is activated by building up a higher actuation force. In this case, a drive power is initially transmitted via the first power transmission train up until the maximum adjustment of the at least one brake lining with respect to a brake body, which is provided in accordance with a maximum braking force within the service brake function. If there is no brake lining wear to be compensated for, the drive element only moves in the first rotational angle range until then. The introduction of higher torques into the actuation device via the at least one drive element results in the clutch shifting and the drive power being forwarded via the third power transmission train. As already described above, this leads to the self-locking rotation-translation gear mechanism of the third power transmission train self-locking and to the at least one actuation element being blocked.

In one exemplary arrangement, the actuation device has a first spring arrangement which is compressed during the transmission of drive power via the first power transmission train and which builds up a spring tension. This spring tension acts on the clutch in such a way that the clutch shifts over to the third power transmission train from a particular spring tension. An arrangement of this kind ensures that the clutch shifts in a manner that is safe and not susceptible to failure.

In one exemplary arrangement, the actuation device has a second spring arrangement which is compressed at a drive power via the third power transmission train and which builds up a spring tension. This spring tension acts between the self-locking rotation-translation gear mechanism of the third power transmission train and the at least one actuation element and leads to this rotation-translation gear mechanism self-locking and the at least one actuation element being locked in a static and stable manner.

As an alternative or in addition to the second spring arrangement, the third power transmission train between the rotation-translation gear mechanism of the third power transmission train and the at least one actuation element could be designed such that corresponding components can be moved up against one another, as a result of which a reaction force that the at least one actuation element experiences can be conducted back into the rotation-translation gear mechanism in order to bring about the self-locking thereof and thereby also block the at least one actuation element.

Both of the aforementioned alternatives advantageously lead to the safe activation of the parking brake function in which, after the braking force has been built up, said force can be maintained in a de-energized manner as a result of the self-locking in the self-locking rotation-translation gear mechanism, which is necessary for the parking brake function.

The electromechanically actuatable motor vehicle brake may be a disk brake or a drum brake.

BRIEF DESCRIPTION OF DRAWINGS

An exemplary arrangement of the actuation device according to the disclosure and the corresponding electromechanically actuatable motor vehicle brake according to the disclosure are explained below with reference to the schematic drawings of FIG. 1 to 7.

DETAILED DESCRIPTION

Figure 1:
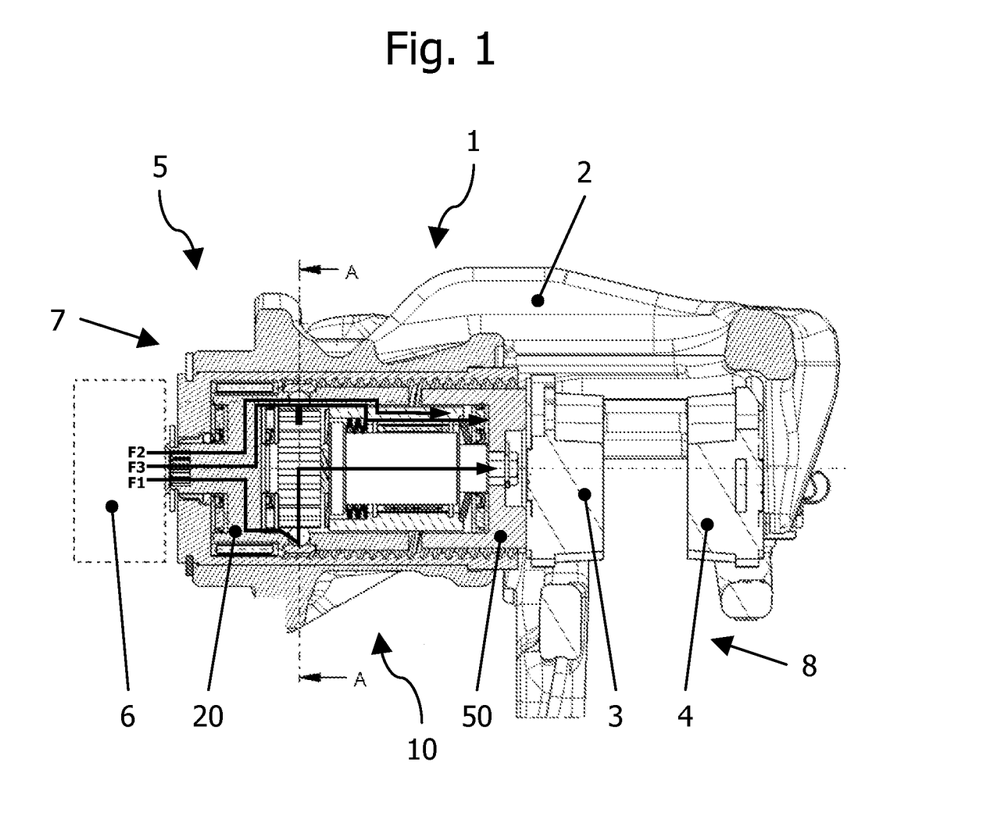
FIG. 1 is a sectional view of the electromechanically actuatable motor vehicle brake.

The exemplary arrangement as shown in FIG. 1 is a floating caliper disk brake, comprising an actuation device (10) according to the disclosure which is installed as a unit in a brake assembly (2) (in this exemplary case a floating caliper). On a drive side (7), a motor drive (electric motor comprising gear mechanism) (6) is coupled to a drive element (20) and drives the drive element (20). The motor drive (6) and the actuation device (10) both belong to an electromagnetic actuation unit (5). A housing (11) of the actuation device (10) is fixed in the brake assembly (2). On a brake side (8), an actuation element (50) is coupled to the brake lining (3) and can transmit movements and forces thereto. Introduced forces and movements are also transmitted to the brake lining (4) via the floating caliper structure.

Figure 2A:
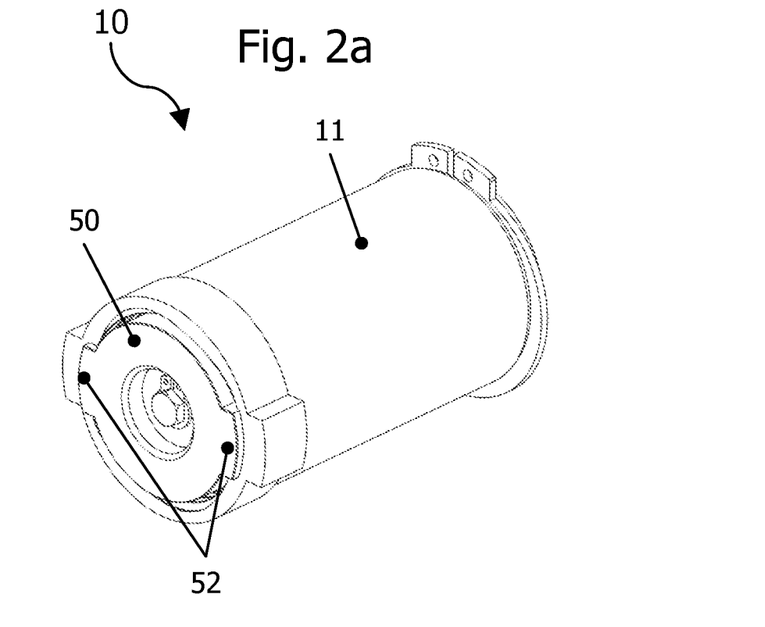
FIG. 2a shows the actuation device.

The structure of the actuation device (10) is described below with reference to FIG. 2 to 6, predominantly with reference to FIG. 2. For the sake of clarity, the reference signs are not always included in all of the figures.

On the drive side (7) of the actuation device (10), the drive element (20) is rotatably mounted in the housing (11) via a drive element bearing (21). A drive interface (22) projects through the housing (11). On the brake side, the housing (11) has a cylindrical opening in which the actuation element (50) is mounted such that it can be extended and retracted in a translational manner. A guide element (52) on the actuation element (50) and a guide portion (18) in the housing are used as a guide and prevent the actuation element (50) from rotating relative to the housing (11). The cylindrical opening continues into the interior of the housing and transitions therein into the housing internal thread (17).

The drive element (20) fulfills several functions. It introduces the drive power into the actuation device (10), is part of a clutch (12), and is part of a free-play coupling (77). In the region of the drive element bearing (21), the drive element (20) is disk-shaped. In an adjoining clutch portion (23), the drive element (20) is hollow. A drive spindle (30), by operation of a clutch portion (32) which is also part of the clutch (12), is accommodated in the hollow region, is rotatably mounted against the drive element (20) via a drive spindle bearing (31), and is axially supported against the drive element (20). A projection (25), which is also part of the drive element (20), adjoins the clutch portion (23) of the drive element (20).

The two clutch portions (23, 32) overlap concentrically with an inner clutch portion (32) and an outer clutch portion (23). Both clutch portions (23, 32) have a plurality of follower seats (24, 34) on the circumference, wherein the follower seats (32) in the clutch portion (32) of the drive spindle (30) are designed as recesses into which the follower elements (16) only slightly dip, and wherein the follower seats (23) are movably guided in the clutch portion (23) of the drive element (20), but these cannot leave in the assembled state. On the outside, an annular pre-loading element (13) is also arranged so as to be concentrically overlapping in the region of the clutch portions (23, 32), which pre-loading element presses the follower elements (16) radially in the direction of the follower seats (32) of the drive spindle and pre-loads them. This pre-loading results in the drive spindle (30) being entrained in rotation up to a certain torque which acts on the drive element (20). The structure of the clutch (12) can best be seen in FIG. 6.

In addition to the clutch portion (32), the drive spindle (30) has a spindle portion (33) which is oriented in the direction of the brake side (8). The drive spindle (30) with its spindle portion (33) drives a spindle nut (40). The spindle nut (40) has an internal thread (41) by which it is operatively connected to the drive spindle (30) in a non-self-locking manner, a coupling region (43) by which the drive spindle (30) is non-rotatably coupled to the actuation element (50), and a contact collar (42). The drive spindle (30) and spindle nut (40) form a rotation-rotation-translation gear mechanism (14).

The spindle nut (40) is arranged in a bore (62) of the adjustment element (60). The adjustment element (60) has a threaded portion (61) which operatively connected to the housing internal thread (17) in a self-locking manner. The adjustment element (60) with its threaded portion (61) and the housing (11) with its housing internal thread (17) thus form the rotation-translation gear mechanism (15). The adjustment element (60) is mounted in a bearing portion (64) by a bearing arrangement (76) so as to be rotatable in relation to the spindle nut (40). The bearing arrangement (76) also allows an axial relative movement between the spindle nut (40) and the adjustment element (60). By its pressure side (65), the adjustment element (60) is axially and rotatably supported in a trough (53) of the actuation element (50) relative to the latter by an axial bearing (71) and is thus operatively connected to the actuation element (50). The pressure side (65) of the adjustment element (60) comprises a spring element system (66). Support between the adjustment element (60) and the actuation element (50) is also provided by a spring arrangement (72) which is arranged between a spring element system (66) and the trough (53) of the actuation element (50). The bore (62) of the adjustment element (60) widens at the end opposite a pressure side (65) and thus forms a contact region (63). The contact region (63) of the adjustment element (60) is operatively connected to a contact collar (42) of the spindle nut (40) via a spring arrangement (75), since the spring arrangement (75) is arranged between the contact region (63) and contact collar (42).

The threaded portion (61) of the adjustment element (60) is also part of a free-play coupling (77), in addition to the projection (25) of the drive element (20). In terms of function, the drive element (20) is thus simultaneously the drive coupling part of the free-play coupling (77), and the actuation element (60) is simultaneously also the output coupling part of the free-play coupling (77). The adjustment element (60) has a recess (67) in the threaded portion (61). The projection (25) engages in the recess (67). Because the projection (25) has rotational play in the recess (67), the drive element (20) can rotate within the play and the recess (67) thus defines the first rotational angle range (A1) of the drive element (20). The angular opening of the recess (67) is delimited by stops (68, 69). The projection (25) is designed as a circular segment, the angular extent of which is delimited by the stops (26, 27). As long as the projection (25) of the drive element (20) rotates within the rotational play, the adjustment element (60) is not entrained in rotation. If the drive element (20) continues to rotate, the stop (26) comes into contact with the stop (69) and, as the rotation continues, the adjustment element (60) is entrained in rotation. The projection (25) and the recess (67) overlap over a certain length in the axial direction, based on the central axis (MA), such that the rotational entrainment can also take place when the drive element (20) and the adjustment element (60) change their position relative to one another in the axial direction. Or, this configuration enables axial movement of the adjustment element (60) with respect to the drive element (20) while maintaining the coupling function of the free-play coupling (77). Axial movements of this kind are brought about by the rotation-translation gear mechanism (15).

Figure 7:
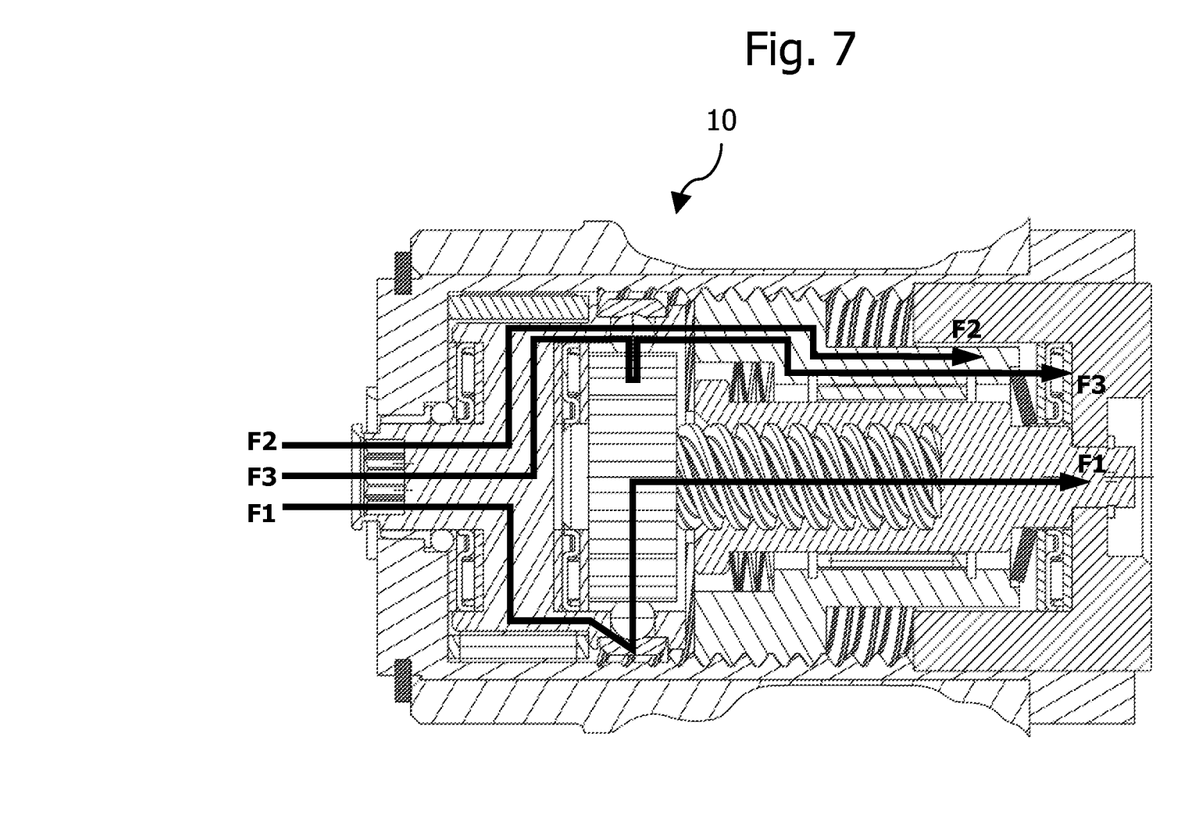
FIG. 7 shows the power transmission trains.

As shown in FIG. 7, the drive power of the drive element (20) can be conducted to the actuation element (50) via power transmission trains F1, F2 and F3. The actuation device (10) fulfills three operating functions: the service brake function, the wear adjustment and the parking brake function.

With the service brake function, the drive power is transmitted via the power transmission train (F1). The service brake function is used to brake the vehicle while driving. With the service brake function, a torque is applied to the drive element (20) and conducted via the drive element (20) into the actuation device (10). The drive element (20) is rotated within the play of the free-play coupling (77), i.e. within the rotational angle range A1. In this case, the clutch (12) is in a first shift mode in which the drive power is transmitted to the drive spindle (30). The rotational entrainment takes place via follower elements (16) which engage in the follower seats (34) of the drive spindle (30). The spindle portion (33) drives the spindle nut (40) in translation in the non-self-locking rotation-translation gear mechanism (14). In so doing, the spring arrangement (75) is compressed and builds up a spring force. The translational movement of the spindle nut (40) is transmitted to the actuation element (50) via the coupling region (43) of the spindle nut (40) and the coupling region (51) of the actuation element (50). In the service brake function, the clearance between the brake lining (3, 4) and the brake disk is thus overcome and a braking force can be applied to the brake disk.

In the event of brake lining wear, the clearance increases to an undesirably great extent. In order to adjust the brake linings, the drive power is transmitted via the power transmission train (F2). If the service brake function is activated, as described above, but with existing brake lining wear, the clearance between the brake lining (3, 4) and the brake disk has not yet been overcome if the play in the free-play coupling (77) has already been overcome and the stop (26)

has come into contact with the stop (69). In this state, the spring force of the spring arrangement (75) is not yet great enough for the clutch (12) to transition into the second shift mode. Rotational entrainment takes place within the rotational angle range (A2) of the adjustment element (60), which also leads to a translational movement of the adjustment element (60) via the self-locking rotation-translation gear mechanism (15). At the same time, the spindle nut (40) is also translated in the direction of the brake side (6) via the rotation-translation gear mechanism (14) and thus also the actuation element (50) to the same extent as the adjustment element (60) until the increased clearance is overcome. If the drive power is withdrawn from the drive element (20), or if the actuation element (50) is retracted, the back movement only takes place via the power transmission train (F1), i.e. via the rotation-translation gear mechanism (14). The readjusted position of the adjustment element (60) is retained as a result of the self-locking.

In the parking brake function, a greater braking force is required to keep the vehicle safely in a parked state. In the parking brake function, the drive power is transmitted via the power transmission train (F3). Up to a certain torque, the drive power is initially transmitted via the power transmission train (F1). Because a greater torque is introduced, the spindle nut (40) covers a greater translational path and the spring arrangement (75) is compressed more. As a result, a greater reaction torque acts on the clutch portion (23) of the drive spindle, the follower elements (16) disengage, and the clutch thus transitions into the second shift mode. The drive element (20) comes into the rotational angle range (A3). The rotation-translation gear mechanism (14) is disabled, and, via the free-play coupling (77), the adjustment element (60) is driven and moved in a translational manner in the direction of the actuation element (50) via the rotation-translation gear mechanism (15). As a result, the spring arrangement (72) is compressed between the pressure side (65) of the adjustment element (60) and the trough (53) of the actuation element (50). This leads to the build-up of a braking force which, as a result of the self-locking rotation-translation gear mechanism (15), remains self-sustaining, even if no further electrical drive power is fed into the system.

The static braking force can be withdrawn again by rotating the drive element (20) back.

Figure 2B:
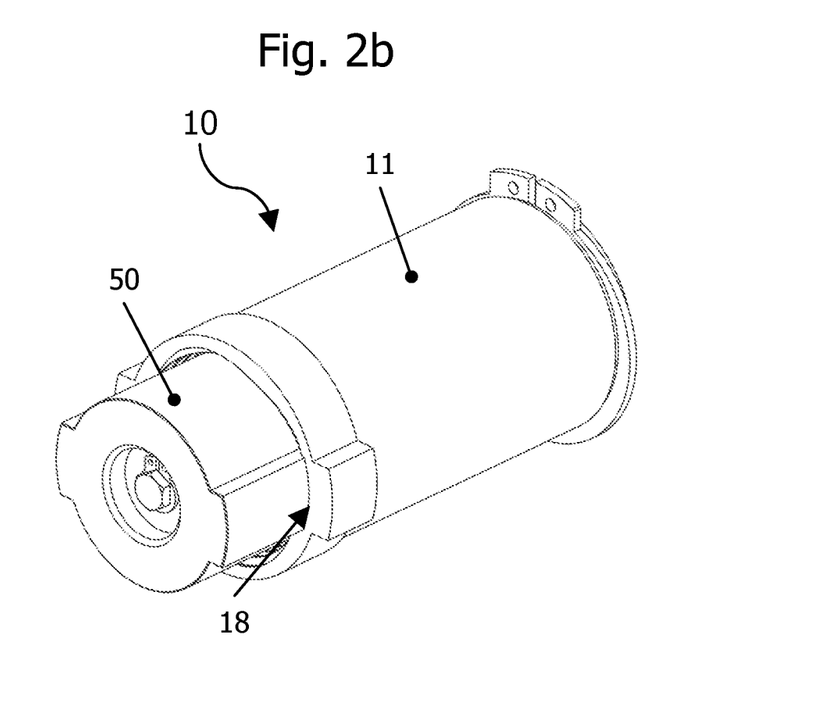
FIG. 2b shows the actuation device with the actuation element extended.
Figure 3A:
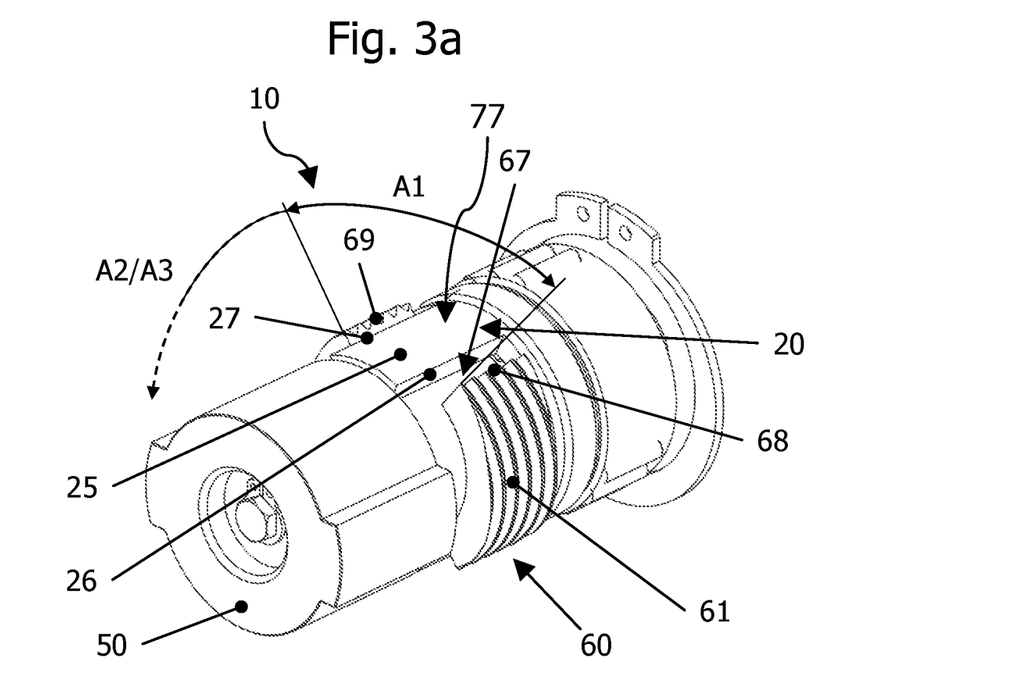
FIG. 3a shows the actuation device without the housing.
Figure 3B:
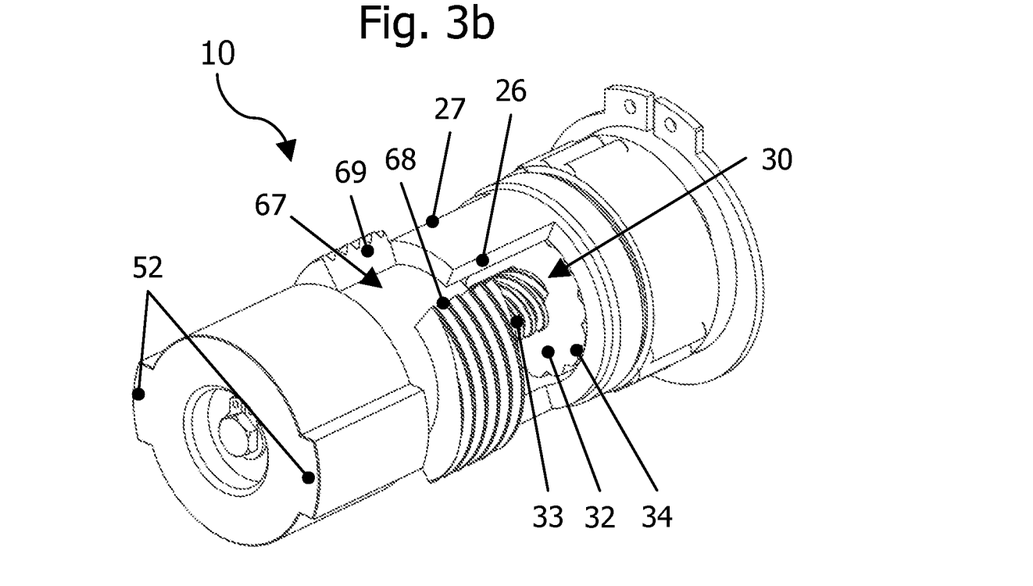
FIG. 3b shows the actuation device without the housing and with the actuation element extended.
Figure 4A:
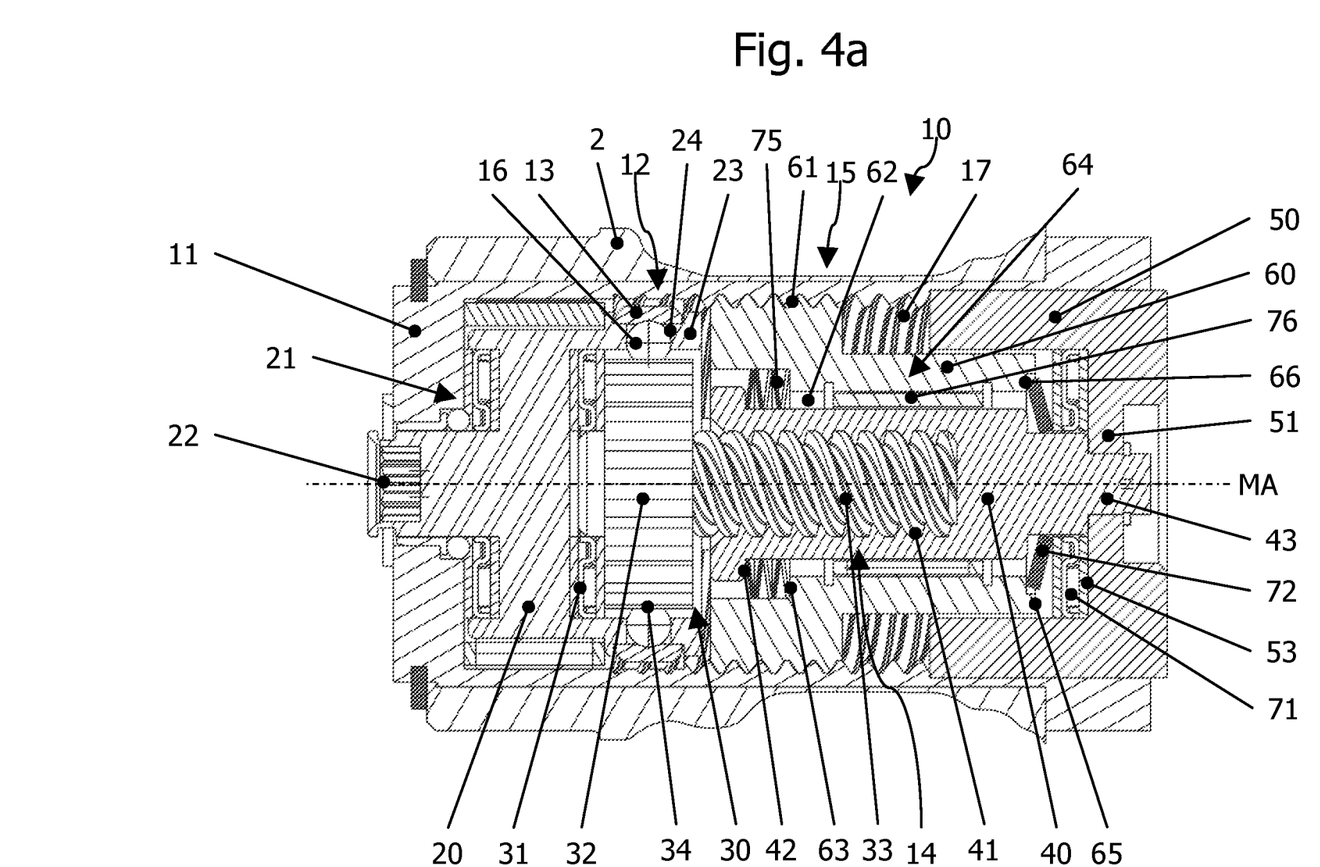
FIG. 4a is a sectional view of the actuation device.
Figure 4B:
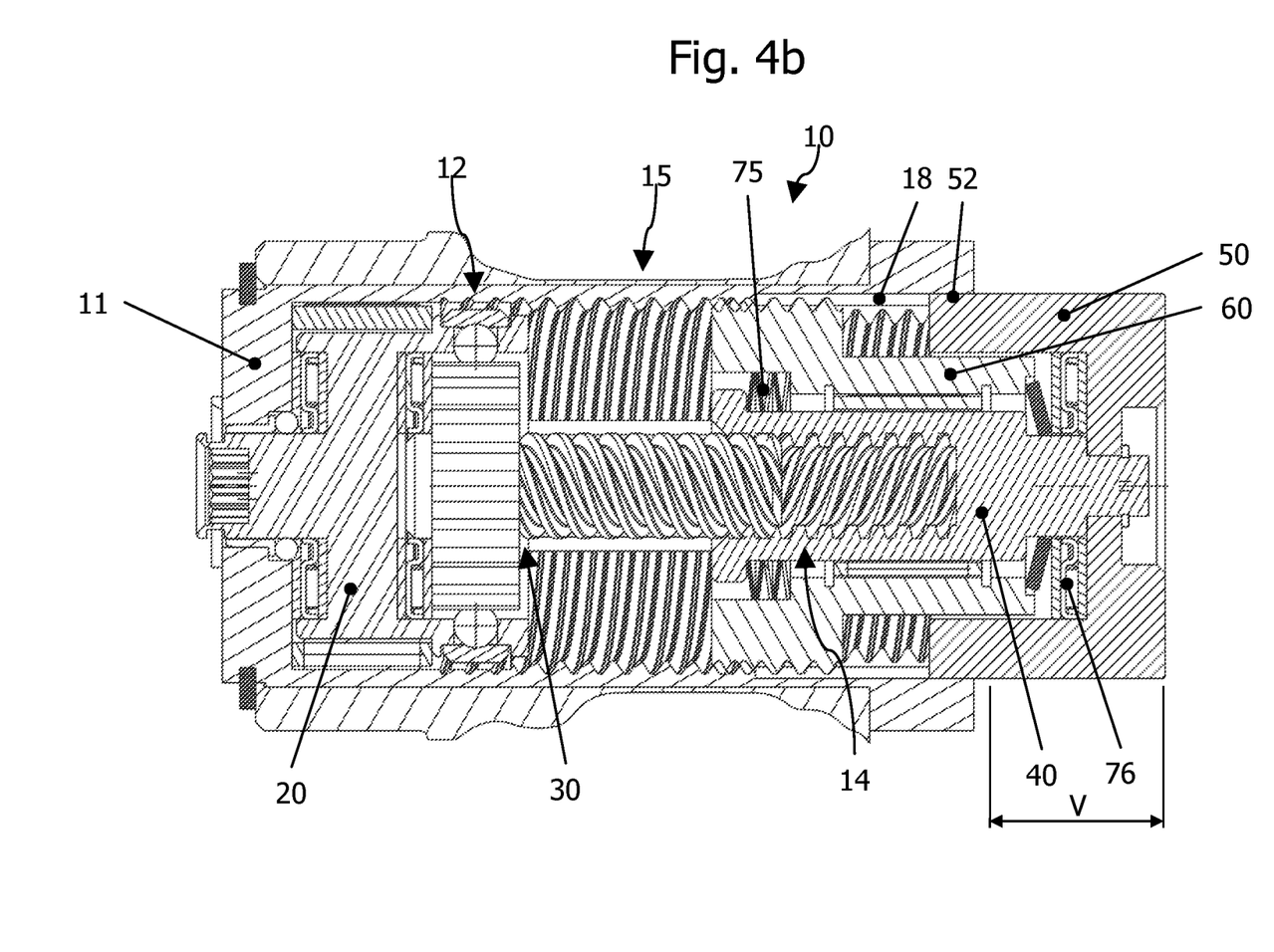
FIG. 4b is a sectional view of the actuation device with the actuation element extended.

FIGS. 2b, 3b and 4b each show the actuation device (10) with the actuation element (50) maximally extended by a distance (V). In this case, the two rotation-translation gear mechanisms (14, 15) are fully extended.

Figures 5, 6:
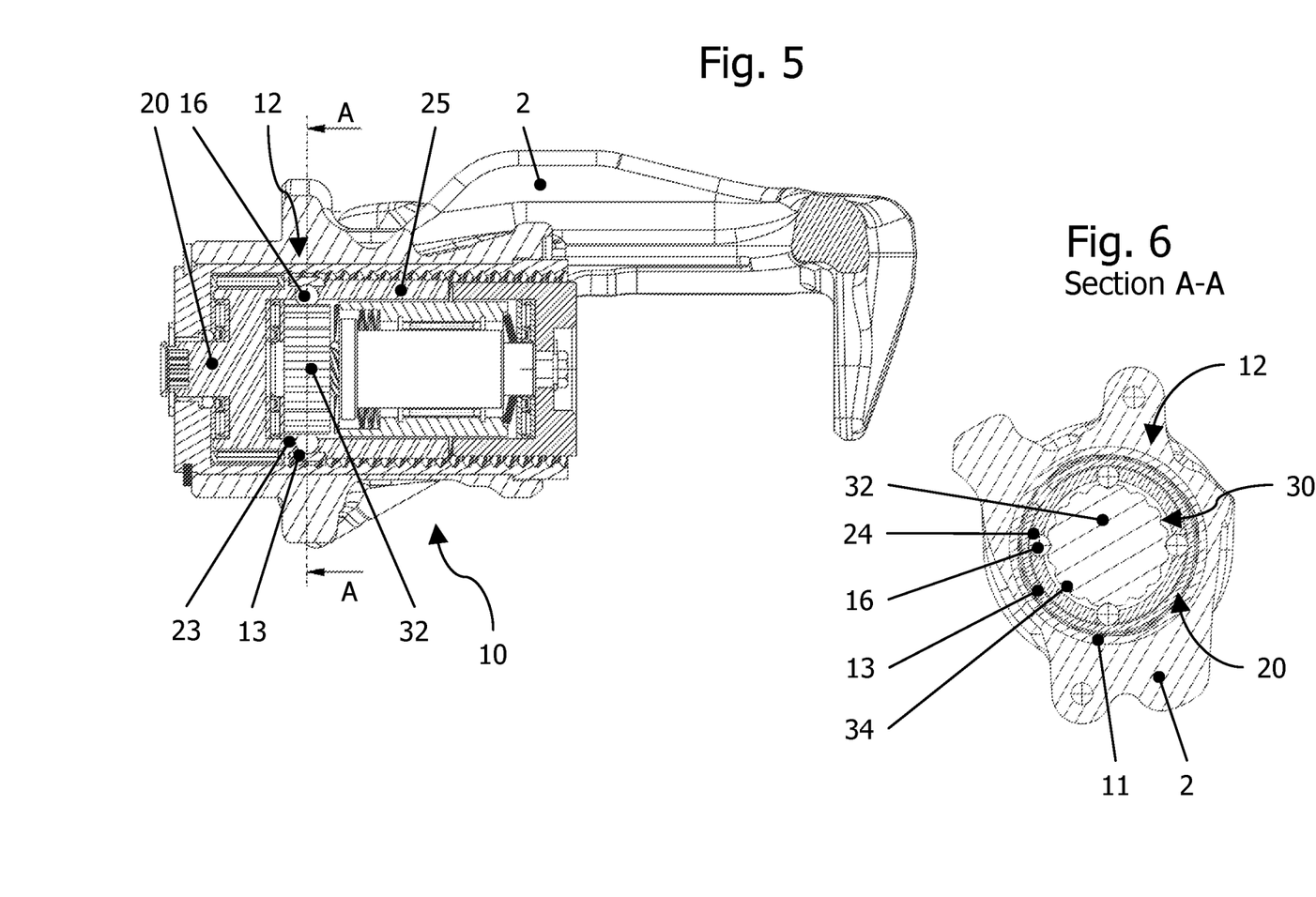
FIG. 5 shows the actuation device with a different angular position of the drive element.
FIG. 6 is a sectional view of the clutch.

In FIG. 5, the drive element (20) has a different rotational angle position by comparison with FIGS. 4a, 4b and 7, so that the full length of the projection (25) can be seen in FIG. 5. In FIGS. 4a, 4b and 7, however, the threaded portion (61) of the adjustment element (60) can be seen in a sectional view.

The invention claimed is:

1. An actuation device for an electromechanically actuatable motor vehicle brake for actuating at least one brake lining of the motor vehicle brake, comprising
    at least one drive element that is configured to be connected to a motor, the at least one drive element having a clutch portion that is hollow,
    a first power transmission train,
    a second power transmission train and
    at least one actuation element,
    wherein the actuation element is designed to actuate the at least one brake lining,
    wherein the at least one drive element can selectively transmit drive power to the first power transmission train or to the first and the second power transmission train,
    wherein the first and second power transmission trains are operatively connected to the at least one actuation element or can be brought into operative connection therewith; and
    wherein a drive spindle is accommodated in the hollow clutch portion of the drive element.

2. The actuation device according to claim 1,
    wherein the first power transmission train comprises a rotation-translation gear mechanism by which a rotational movement of the at least one drive element can be converted into a translational movement, and
    wherein the second power transmission train comprises a rotation-translation gear mechanism by which a rotational movement of the at least one drive element can be converted into a translational movement.

3. The actuation device according to claim 2,
    wherein the rotation-translation gear mechanism of the first power transmission train is not self-locking and
    wherein the rotation-translation gear mechanism of the second power transmission train is self-locking.

4. The actuation device according to claim 3,
    wherein the at least one drive element is operatively connected to the first and second power transmission trains such that, when the at least one drive element rotates in a first rotational angle range, drive power is transmitted to the at least one actuation element via the first power transmission train and that, when the at least one drive element rotates in a second rotational angle range, drive power is transmitted to the at least one actuation element via the first and the second power transmission train, and
    wherein the second rotational angle range adjoins the first rotational angle range.

5. The actuation device according to claim 4,
    wherein the actuation device comprises at least one clutch,
    wherein the clutch, in a first shift mode, allows power to be transmitted from the at least one drive element to the first and/or the second power transmission train.

6. The actuation device according to claim 5,
    wherein the clutch is designed as a self-shifting clutch.

7. An electromechanically actuatable motor vehicle brake comprising:
    a brake assembly,
    at least one brake lining, and
    at least one electromechanical actuation unit which comprises
    an actuation device according to claim 1 and
    a motor drive which drives the at least one drive element of the actuation device.

8. The electromechanically actuatable motor vehicle brake according to claim 7,
    wherein the electromechanically actuatable motor vehicle brake is a disk brake or a drum brake.

9. An actuation device for an electromechanically actuatable motor vehicle brake for actuating at least one brake lining of the motor vehicle brake, comprising
    at least one drive element,
    a first power transmission train that comprises a rotation-translation gear mechanism by which a rotational movement of the at least one drive element can be converted into a translational movement, a second power transmission train that comprises a rotation-translation gear mechanism by which a rotational movement of the at least one drive element can be converted into a translational movement and at least one actuation element that comprises at least one clutch, wherein the clutch, in a first shift mode, allows power to be transmitted from the at least one drive element to the first and/or the second power transmission train wherein the actuation element is configured to actuate the at least one brake lining, wherein the at least one drive element selectively transmits drive power to the first power transmission train or to the first and the second power transmission train, and wherein the first and second power transmission trains are operatively connected to the at least one actuation element or can be brought into operative connection therewith;

wherein the rotation-translation gear mechanism of the first power transmission train is not self-locking and wherein the rotation-translation gear mechanism of the second power transmission train is self-locking;

wherein the at least one drive element is operatively connected to the first and second power transmission trains such that, when the at least one drive element rotates in a first rotational angle range, drive power is transmitted to the at least one actuation element via the first power transmission train and that, when the at least one drive element rotates in a second rotational angle range, drive power is transmitted to the at least one actuation element via the first and the second power transmission train, and wherein the second rotational angle range adjoins the first rotational angle range;

wherein the clutch, in a second shift mode, allows power to be transmitted from the at least one drive element to a third power transmission train, wherein the third power transmission train is operatively connected to the at least one actuation element or can be brought into operative connection therewith.

10. The actuation device according to claim 9, wherein the rotation-translation gear mechanism of the second power transmission train is also part of the third power transmission train, wherein the at least one drive element is operatively connected to the at least three power transmission trains or can be brought into operative connection therewith such that, when the at least one drive element rotates in a third rotational angle range which adjoins the first rotational angle range, drive power is transmitted to the at least one actuation element via the third power transmission train.

11. The actuation device according to claim 9, wherein the clutch shifts, in a torque-dependent manner, at a threshold torque.

12. The actuation device according to claim 11, wherein the at least one drive element provides a torque and wherein, in the first shift mode, the torque of the at least one drive element is less than the threshold torque.

13. The actuation device according to claim 12, wherein, in the second shift mode, the torque of the at least one drive element is greater than the threshold torque.

14. The actuation device according to claim 13, wherein the clutch is designed as a self-shifting clutch.

15. The actuation device according to claim 9, wherein the clutch is designed as a self-shifting clutch.

* * * * *